United States Patent [19]

Kawashima et al.

[11] Patent Number: 4,871,194
[45] Date of Patent: Oct. 3, 1989

[54] OIL WELL PIPE JOINT AND MANUFACTURING METHOD THEREFOR

[75] Inventors: Hisakazu Kawashima, Takarazuka; Yoshiyasu Morita, Nara; Minoru Nishihara, Kyoto; Tetsuzo Arai, Takarazuka; Kunihiro Fukui, Kawanishi, all of Japan

[73] Assignee: Sumitomo Metal Industries, Ltd., Osaka, Japan

[21] Appl. No.: 146,367

[22] PCT Filed: May 2, 1986

[86] PCT No.: PCT/JP86/00229
 § 371 Date: Dec. 31, 1987
 § 102(e) Date: Dec. 31, 1987

[87] PCT Pub. No.: WO87/06673
 PCT Pub. Date: Nov. 5, 1987

[51] Int. Cl.⁴ .................................................. F16L 15/00
[52] U.S. Cl. ........................................ 285/55; 285/94; 285/329; 285/334
[58] Field of Search ............... 285/334, 333, 355, 55, 285/329, 94; 427/180, 181, 421

[56] References Cited

U.S. PATENT DOCUMENTS

| | | | |
|---|---|---|---|
| 1,787,012 | 12/1930 | Moore | 285/329 X |
| 2,893,759 | 7/1959 | Blose | 285/334 |
| 3,996,398 | 12/1976 | Manfredi | 427/191 |
| 4,468,309 | 8/1984 | White | 204/192 N |
| 4,474,651 | 10/1984 | Yauchi et al. | 204/34 |
| 4,506,432 | 3/1985 | Smith | 285/329 X |
| 4,513,995 | 4/1985 | Niehaus et al. | 285/355 X |
| 4,527,815 | 7/1985 | Frick | 285/55 |
| 4,630,849 | 12/1986 | Fukui et al. | 285/422 X |

FOREIGN PATENT DOCUMENTS 56-109975 8/1981 Japan.
59-9312 3/1984 Japan.

Primary Examiner—Thomas F. Callaghan
Attorney, Agent, or Firm—Burns, Doane, Swecker & Mathis

[57] ABSTRACT

The present invention relates to an oil well pipe joint having improved resistance to galling and to a process for manufacturing the same, which comprises a porous blast-plated layer provided at least on a metal sealing portion by blasting soft metal particles such as of zinc and aluminum, particularly discrete particles each comprising an iron or iron alloy core covered by a zinc or a zinc alloy coating with an iron-zinc alloy layer intervening therebetween.

20 Claims, 1 Drawing Sheet

OIL WELL PIPE JOINT AND MANUFACTURING METHOD THEREFOR

BACKGROUND OF THE INVENTION

1. Field of the Invention

The present invention relates to an oil-well pipe joint with improved sealing properties and galling resistance and to a method for the manufacture thereof, and particularly to an oil-well pipe joint which comprises a blast-plated layer of soft metal particles at least on the surface of a metal sealing portion and which is free from delayed fracture and a manufacturing method therefor.

2. Description of Related Art

Recently, the environment in which oil-wells and gas-wells are being drilled is becoming increasingly severe. In such an environment, oil well tubes such as drill pipes and casing pipes are usually subjected to a high pressure such as $3.5 \sim 14.0$ kgf/mm$^2$ ($5,000 \sim °,000$ psi), so that a high level of sealing properties is required for oil well pipe joints. The same applies to gas well pipe joints. Therefore, these pipes and joints are collectively referred to as "oil well pipes" and "oil well pipe joints" respectively hereinafter in this specification.

In general, oil well pipes are connected by joints and must be used repeatedly. Therefore, an oil well pipe is always subjected to connecting and disconnecting. An oil well pipe joint comprises a threaded portion and a metal sealing portion. In order for the joint to exhibit adequate sealing properties to endure the above-mentioned high pressure, a high degree of contact pressure must be applied to the metal sealing portion as well as the threaded portion.

Thus, the occurrence of galling of the metal sealing portion as well as the threaded portion is unavoidable when the connecting and disconnecting are repeated.

Therefore, in order to prohibit the occurrence of galling and to strengthen the sealing properties, a surface treatment is applied to the metal sealing portion of an oil well pipe joint. Usually the surface treatment includes the formation of a chemically-formed film, such as one of zinc phosphate, manganese phosphate, and iron oxalate. However, these surface films deteriorate when the service temperature goes over 200 C., resulting in "leakage".

Currently the environment of oil-wells is getting more severe, and it is not usual for oil well pipe joints to be used at a temperature of 300° C. or more, e.g. 300° C.$\sim$350° C. Thus, it is said that the provision of a plating layer of a soft metal having a high melting point is effective to cope with such deterioration of the chemically-formed film.

In addition, since the environment of the oil wells is getting more severe, a high-strength high-alloy material which is not described in API specifications is increasingly employed.

API specifications require a strength on the order of $55 \sim 110$ ksi (1 ksi$=0.7$ kgf/mm$^2$) and carbon steels as materials. However, the strength level required at present is a yield strength of $140 \sim 155$ ksi and the type of the high-alloy now employed is that containing $5 \sim 45\%$, and usually $9 \sim 25\%$ of Cr and $0 \sim 60\%$ of Ni. Only electroplating is applicable to such high alloy materials, but it is not easy to carry out electroplating since it is rather difficult to activate the surface of the alloy, resulting in inadequate resistance to galling.

U.S. Pat. No. 4,474,651, for example, proposes the provision of an activated layer on the metal sealing portion or threaded portion of a pipe joint before metal plating.

However, even if such an activated layer is provided, the pin itself is as long as $9 \sim 12$ m, and there are many difficulties in carrying out metal plating of such a long member so far as a plating apparatus therefor and operating conditions are concerned. Therefore, such a method can not be immediately employed due to problems with its practicality.

In addition, when an electroplating is applied to a high strength material, a delayed fracture occurs due to the presence of hydrogen penetrated from a plating bath into an electroplated layer and the base steel. Should such a fracture occur, needless to say, there is the fear of a serious accident taking place in the oil well. Complete precautions are necessary to avoid such troubles.

As oil well pipe joints employ increasingly stronger and higher-alloy materials, degradation in sealing properties and galling resistance has been experienced. An improvement in these properties is highly desired.

In order to avoid the before-mentioned delay fracture, a heating treatment called "baking" is carried out after electroplating to diffuse hydrogen. However, such a treatment has the drawbacks that it takes a long time and it can not suppress the delay fracture. An improvement in the resistance to delay fracture is also desired.

One known dry-plating method is blast plating. As for the materials for use in blasting, Japanese Patent Publication No. 9312/1984 discloses a blasting material comprising a core of iron or an iron alloy covered with zinc or a zinc alloy coating with a layer of a zinc-iron alloy therebetween. Blasting plating is carried out as a dry plating method so as to improve the corrosion resistance of a steel substrate. However, the corrosion resistance of the resulting plating is not enough for such purposes. Therefore, it is used for only very limited applications. Furthermore, so far as the blasting material disclosed in the above-mentioned Japanese patent is concerned, an improvement in the corrosion resistance of the resulting plating is not expected, and an additional surface treatment is required. Thus, the blasting material has not yet been satisfactorily utilized.

SUMMARY OF THE INVENTION

An object of the present invention is to provide an oil well pipe joint and a method for the manufacture thereof, in which in place of conventional electroplating, blasting plating is carried out to blast soft metal particles in the same manner as sand blasting so as to prevent galling and to strengthen sealing properties at high temperatures.

Another object of the present invention is to provide an oil well pipe joint and a method for the manufacture thereof, in which a high-strength and high-alloy material is used and the sealing properties and the galling resistance are improved.

The inventors of the present invention have studied a blasting plating method to achieve such purposes, and have found that blasting plating is effective to improve the galling resistance of oil well tube joints. In the past, blasting plating was used to improve corrosion resistance. After continuing study, the inventors found that when soft metal particles, particularly particles covered with a soft metal coating are used as blasting particles, the resulting blast plating is, needless to say, free from delay fracture and has improved bonding strength to the substrate. The blast plating has a porous structure with improved ability to retain a lubricant, so that the resistance to galling is markedly improved. Thus, the present invention was discovered.

The present invention resides in an oil well pipe joint having a blast plating at least on a metal sealing portion thereof, the blast plating being 1~30 μm and preferably 5~15 μm thick and comprising fine particles of a soft metal or an alloy thereof having a melting point higher than the service temperature.

In another aspect, the present invention resides in a method of manufacturing an oil well pipe joint, which comprises subsequent to finish machining a threaded portion and a metal sealing portion of an oil well pipe joint, blasting particles of a soft metal or an alloy thereof having a melting point higher than the service temperature thereof, e.g., 400° C. at a high rate, e.g. with air pressure onto a machined surface at least of the metal sealing portion.

The soft metal particles may be discrete particles each having an iron or iron alloy core covered with zinc or a zinc alloy with an iron-zinc alloy layer intervening between them.

When such a specific blasting material is used, a blast plating can be obtained which has a large bonding strength to the steel substrate and the porous structure of which has been improved to give remarkable ability to retain a lubricant.

In another aspect, the present invention resides in an oil well pipe joint having improved galling resistance with a porous blast plating at least on a metal sealing portion thereof, the blast plating being obtained by blasting discrete particles each having an iron or iron alloy core covered with zinc or a zinc alloy with an iron-zinc alloy layer intervening therebetween.

The above-defined blast plating means a soft metal layer of the multi-layered type, each of which is applied by blasting fine particles of a soft metal or cored particles against the surface to be treated at a high speed to mechanically eat into the substrate surface. The heat generated at that time melts part of the particles, with the result that the thus-formed melt firmly adheres to the surface to be treated to strengthen the bonding between them.

According to the present invention the soft metal includes Zn, Al, and the like.

The thickness of the blast plating is usually 1~30 μm. In order to obtain the intended effect, a thickness of at least 1 μm is necessary. On the other hand, when the thickness is over 30 μm, no further improvement in the intended effort can be expected.

In a preferred embodiment, the diameter of the particle is usually 0.05~1.5 mm, and the blasting pressure is usually 2~6 kgf/cm². When the particle diameter is smaller than 0.05 mm, a satisfactory level of impact force cannot be obtained, namely a satisfactory level of heat generation is not expected, even if the injection pressure is raised.

On the other hand, when the diameter is larger than 1.5 mm, a uniform blast plating cannot be obtained. In addition, the blasting pressure in the above range is necessary to ensure the required amount of heat as well as the required mechanical bonding between the particles and the machined surface.

On the other hand, in the case of the before-mentioned iron-zinc cored particle, a preferable particle diameter is 0.1~1.5 mm.

Thus, according to the method of the present invention, in place of conventional wet-type electroplating, a simple just like sand blasting method is applicable, and a metal sealing portion can be easily covered with a soft metal by a dry process, and the resulting plating is free from delay fracture, since adsorbtion of hydrogen does not occur at all.

DETAILED DESCRIPTION OF THE PREFERRED EMBODIMENTS

The present invention will be further described in conjunction with the accompanying drawings.

Figure 1:
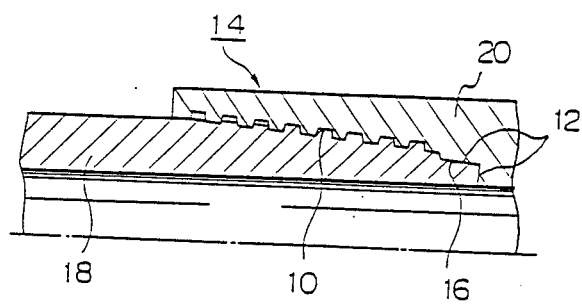
FIG. 1 is a diagrammatical sectional view of an oil well pipe joint.

FIG. 1 is a sectional view of part of an oil well pipe joint of the pin-box type of the present invention. The oil well pipe joint 14, which comprises a thread portion 10 and a metal sealing portion 12, is provided with a blast plating layer 16 in accordance with the present invention on at least the metal sealing portion 12.

This applies to both the pin 18 and box 20.

The oil well pipe joint is usually finished by machining. Onto machined surfaces of the thus-finished threaded portion and metal sealing portion, or at least the metal sealing portion, according to the present invention, soft metal particles are blasted through a suitable blasting apparatus to form a blast plating.

The thus-forming blast plating 16 is porous, and especially in the case of blasting particles having an iron or an iron-alloy core covered with zinc or a zinc alloy, the porosity is 20~80%. After the formation thereof a conventional lubricant, e.g., a grease-based thread compound containing powders such as graphite, lead, zinc, and copper powders (API BUL 5A2, for example) are impregnated into the porous layer. Therefore, in addition to the resistance to galling which is inherent to the plating layer, the lubricating action given by the lubricant which is firmly retained in the porous layer will further strengthen the resistance to galling. Thus, an improved level of sealing properties can also be maintained even after repeated use.

A method of providing such a porous blast layer in accordance with the present invention will be further described.

Figure 2:
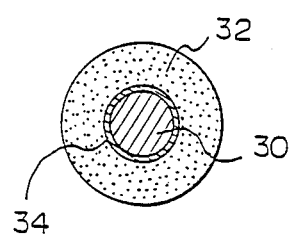
FIG. 2 is a diagrammatical sectional view of a blasting particle utilized in the present invention.

FIG. 2 is a sectional view of a preferred embodiment of a blast particle containing a core which is utilized in the present invention. The core 30 is made of iron or an iron alloy and is covered with a zinc or a zinc alloy coating 32. In the boundary region an iron-zinc alloy layer 34 is formed.

In general, the weight ratio of the zinc or zinc alloy in such a particle is 20~60% by weight. The ratio of the iron or iron alloy, therefore, is 40~80% by weight.

As already mentioned, such a cored particle itself is known in the art, and a further description thereof will be omitted.

A blasting material comprising cored particles having a core of iron or an iron alloy covered with a zinc or a zinc alloy coating with an iron-zinc alloy layer intervening between them is blown onto a threaded portion and metal sealing portion or at least a metal sealing portion of a pin or box by using a conventional blasting apparatus represented by the before-mentioned air-blasting apparatus. In this specification, such a blasting plating process is called a mechanical plating process, which is abbreviated as "MP process".

Figure 3:
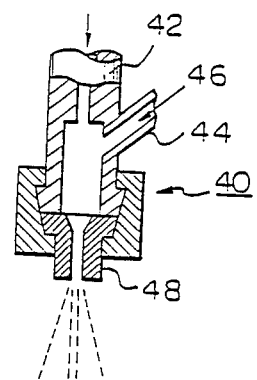
FIG. 3 is a diagrammatical sectional view of a particle blasting apparatus of the air-blasting type.

FIG. 3 is a diagrammatical sectional view of an apparatus 10 for blasting soft metal particles entrained in air.

Through a conduit 42, a fluid under pressure, usually compressed air, is supplied. Through a side pipe 44 a blasting material 46 is added to a flow of high-pressure fluid. The air-entrained blasting material is blown via a nozzle 48 onto a machined surface including that of the metal sealing portion of the above-described oil well pipe joints (not shown). In the air-blowing type, the blasting speed is usually 50~100 m/sec, and the amount or rate of blasting material is 0.5~20 kg/min.

Thus, when blasting particles are blown onto the surface together with compressed air at an extremely high speed, part of the blasting particles are melted due to the heat generated upon impingement to give a plated layer on the surface to be treated. The blast plating thus obtained is different from conventional chemically-formed films or electroplating in that particles are partially embedded in the surface of the substrate by the impact force upon impingement to achieve bonding between the substrate surface and particles, which may be called mechanical bonding, resulting in a remarkably high bonding strength. More particularly, as is apparent from a preferred embodiment of the present invention, when particles with an iron or iron alloy core are blown, the impact force upon impingement is concentrated on the core particle to further strengthen the bonding. In addition, a porous structure can be obtained, which is advantageous for retaining a lubricant for use in connecting and disconnecting oil well pipe joints.

In addition to the above-mentioned blasting means utilizing compressed air, other means for blowing blasting particles may be a mechanical blasting apparatus (not shown in the attached drawings) called an impeller-type blaster, in which blasting particles are blown onto the substrate surface by means of impellers attached to a rotating shaft. The blasting particles are supplied to the central portion of the impellers which are rotating at high speed.

By using the above-mentioned mechanical blasting apparatus of the impeller type, it is possible to achieve high-speed blasting, generally at a blasting speed of 30~80 m/sec at a rate of 20~100 kg/min.

The present invention is not restricted to a specific means of blasting. The blasting conditions are not restrictive. Any suitable means and conditions may be selected so as to ensure that the necessary amount of heat is generated, a required level of mechanical bonding is achieved between the blasting particles and the machined surface, and a satisfactory level of mechanical bonding is achieved between the blasting particles and the machined surface, and a satisfactory level of porosity is attained in the porous plating film.

For example, in a preferred embodiment of the present invention, the diameter of the cored particle constituting blasting particles is generally 0.1~1.5mm, and the propellant force, i.e. impact pressure is generally 2~6 kgf/mm$^2$. In the case of cored particles, when the diameter is smaller than 0.1 mm, a satisfactory level of impact pressure, i.e. mechanical bonding strength to the substrate surface cannot be obtained even if the propellant force is increased. On the other hand, if the diameter is larger than 1.5 mm, a uniform blast plating cannot be obtained, and the precise shape of the threaded portion of the oil well pipe joint might be damaged.

The degree of porosity of the porous plating film is generally 20~80% for the case in which the before-mentioned cored particles are used. When the blasting rate is high, the porosity is small. When the diameter of particles is small, the porosity is also small. There seems to be a tendency that the larger the diameter, the greater the porosity. Preferably, the porosity is 40~60%.

Figure 4:
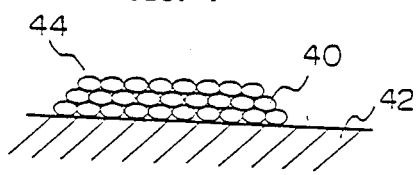
FIG. 4 is a rough sectional view of the blast plating formed in accordance with the present invention.

The film obtained by means of the MP process (hereinafter referred to as "MP film") is as shown diagrammatically in FIG. 4. Minute pieces 40 of an iron-zinc alloy are piled one over another on the surface of a steel member 42. The MP film is generally porous, and a lubricant (not shown) may be retained in such porous portions of the film when used.

Therefore, when a lubricant such as thread compounds defined in API specifications is impregnated upon connection of oil well pipe joints, the lubricant can be thoroughly retained within such a porous MP film.

When a pipe joint is connected, the metal sealing portion is subjected to a high pressure on the surface thereof. Since conventional surface treatments do not result in a surface film porous enough to retain lubricant well, some of the lubricant is expelled from the surface during connecting and disconnecting. So far as the conventional surface treatment is concerned, it is rather difficult to retain a lubricant in a surface film. However, according to the present invention, a lubricant which has been impregnated into the film can easily be supplied from within the MP film at a high pressure. Thus, according to the present invention, the resistance to galling is remarkably improved in comparison with that in the prior art.

Furthermore, since the surface film of the present invention is comprised of particles blasted formed into layers, each layer of the blasted particles easily slides and sometimes some of the particles are removed from the surface by shearing force caused to rotation of the metal sealing portion during connecting and disconnecting. However, the peeling off of the surface film does not occur. As a result, the resistance to galling is remarkably improved in accordance with the present invention.

Thus, according to the present invention, it is possible to treat an oil well pipe joint made of high-strength and high-alloy material with the before-mentioned blasting plating after machining. Uniformity of the quality of pipe joints can be achieved. In addition, the process of the present invention can easily be applied to long pin-type and box-type pipes. The performability of the process of the present invention is much superior to that of the conventional process, and it is safe and free from contamination of the environment.

Furthermore, the blast plating obtaining by the present invention is formed under fully dry conditions, and is free from hydrogen adsorption during plating. Thus, the plating does not cause any delay fracture, which at present creates numerous problems.

The present invention will be described in further detail in conjunction with some working examples, which are merely illustrative and in no way restrict the present invention.

EXAMPLE 1

Steel pipes were manufactured from materials having Composition A or Composition B shown in Table 1 and were machined to form a sealing portion and threaded portion such as shown in FIG. 1. Blasting plating was carried out on the sealing portion and threaded portion by using the blasting apparatus shown in FIG. 2 to form a blast-plated layer of various soft metals with a thickness of 10 μm.

In this example, soft metal particles which did not have a core of a different metal were used.

For comparison, pipe joints each having a metal sealing portion and threaded portion coated by a chemically-formed zinc phosphate film and an electroplated film were prepared.

The thus-prepared pipe joints were connected and the sealing properties were evaluated under the conditions summarized in Table 2. Water under pressure was forced into the pipe joint until the pipe body burst or a leakage of water occurred.

For Examples No. 1 and No. 2, which had a conventional chemically-formed film, water leakage occurred at a pressure of only 900~950 kgf/cm². In the case of the conventional electroplated film (Example No. 3), water leakage did not occur until the pipe body burst. According to the present invention, too, the sealing integrity of the joint was maintained until the pipe body burst. This fact shows that the pipe joint of the present invention exhibits the same level of sealing properties as a pipe joint obtained by the conventional electroplating method.

In the examples of the present invention, connecting and disconnecting was repeated 20 times and then the same pipe joint was subjected to the above-mentioned sealing property test. In contrast, for the conventional examples since galling occurred after 6~11 times of connecting and disconnecting, the sealing property test was carried out on another pipe joint which was connected one time.

According to the present invention, it takes about 20 minutes to perform blasting plating on one piece. This is the same as the treating time for the conventional electroplating method.

Next, a delay fracture test was carried out in order to determine the differences between the present invention and the conventional electroplating method. In the same manner as for Examples No. 3 and No. 4 shown in Table 2, an electroplated zinc film and a blast-plated zinc film each 10 μm thick were formed on the substrates, which were then subjected to a baking treatment to determine the effect of baking.

The results of the delay fracture test are summarized in Table 3, in which an electroplated zinc film was formed on the conventional example and a blast-plated film of zinc particles was formed on the example of the present invention.

Since the taking-up of hydrogen occurs during electroplating, oil well pipe materials of high strength suffer from delay fracture, and there is a tendency for the pipe portion of a pipe joint to burst. In the conventional electroplating method, a baking treatment (250° C. ×24 hr. holding) is carried out after electroplating so as to diffuse and remove the hydrogen dissolved so that delay fracture can successfully be prevented. In contrast, according to the present invention, as shown for Examples No. 6 and No. 7 of Table 3, the pipe joint is free from delay fracture without performing baking treatment, and a rather remarkable improvement in various properties can be achieved. Example No. 5 is an example of the present invention on which baking treatment was carried out even in the present invention. There is no substantial difference regarding the results, proving that the present invention does not require baking treatment.

In the case of Composition B which is a high-strength and high-alloy composition, delay fracture does not occur even when electroplating is applied. However, as shown for Examples No. 14 and No. 19 of Table 2 it does not exhibit a satisfactory level of resistance to galling and sealing properties.

Thus, it is apparent from the foregoing that according to the present invention, the treating time can be reduced markedly and the resulting pipe joint exhibits excellent sealing properties as well as improved resistance to galling and delay fracture.

TABLE 1

| Alloy | (% by weight) | | | | | | | |
|---|---|---|---|---|---|---|---|---|
| | C | Si | Mn | P | S | Cr | Mo | Ni |
| A | 0.24 | 0.29 | 1.23 | 0.02 | 0.007 | 0.58 | 0.46 | — |
| B | 0.02 | 0.52 | 0.76 | 0.01 | 0.003 | 24.1 | 6.2 | 48.4 |

TABLE 2

| Alloy | No. | Outer Diameter (mm) | Thickness (mm) | Yield Stress (kgf/mm²) | Surface Treatment (Film Thickness) | Clamp Torque (kgf·m) | Galling | Pressure Applied (Max.) | Remarks |
|---|---|---|---|---|---|---|---|---|---|
| A | 1 | 88.9 | 7.34 | 63 | Zn Phosphate (10 μm) | 510 | Occurred after 7 repetitions | Leakage at 900 kgf/cm², 300° C.(3) | Conventional |
| | 2 | " | " | " | Mn Phosphate (10 μm) | " | Occurred after 8 repetitions | Leakage at 950 kgf/cm², 300° C.(3) | |
| | 3 | " | " | " | Zn Electroplating (10 μm) | " | Occurred after 7 repetitions | Body of pipe burst at 1260 kgf/cm², 300° C.(3) | |
| | 4 | " | " | " | Zn Blowing (10 μm) | " | No occurrence after 20 repetitions | Body of pipe burst at 1250 kgf/cm², 300° C.(4) | Invention |
| | 5 | " | " | " | Al Blowing (10 μm) | " | " | Body of pipe burst at 1270 kgf/cm², 300° C.(4) | |
| | 6 | " | " | " | Al Blowing (10 μm) | " | " | Body of pipe burst at 1260 kgf/cm², 400° C.(4) | |
| A | 7 | 219.1 | 8.94 | 63 | Zn Phosphate (10 μm) | 1100 | Occurred after 6 repetitions | Leakage at 450 kgf/cm², 300° C.(3) | Conventional |
| | 8 | " | " | " | Mn Phosphate (10 μm) | " | Occurred after 7 repetitions | Leakage at 470 kgf/cm², 300° C.(3) | |
| | 9 | " | " | " | Zn Electroplating (10 μm) | " | Occurred after 6 repetitions | Body of pipe burst at 620 kgf/cm², 300° C.(3) | |
| | 10 | " | " | " | Zn Blowing(1) (10 μm) | " | No occurrence after 20 repetitions | Body of pipe burst at 620 kgf/cm², 300° C.(4) | Invention |
| | 11 | " | " | " | Al Blowing(2) | " | " | Body of pipe burst at |

TABLE 2-continued

| Alloy | No. | Outer Diameter (mm) | Thickness (mm) | Yield Stress (kgf/mm²) | Surface Treatment (Film Thickness) | Clamp Torque (kgf · m) | Galling | Pressure Applied (Max.) | Remarks |
|---|---|---|---|---|---|---|---|---|---|
| | | | | | (10 μm) | | | 618 kgf/cm², 300° C.[4] | |
| | 12 | " | " | " | Al Blowing[2] (10 μm) | " | " | Body of pipe burst at 625 kgf/cm², 400° C.[4] | |
| | 13 | " | " | " | Al Blowing[2] (10 μm) | " | " | Body of pipe burst at 621 kgf/cm², 500° C.[4] | |
| | 14 | 88.9 | 7.34 | 63 | Zn Electroplating (10 μm) | 510 | Occurred after 8 repetitions | Body of pipe burst at 1265 kgf/cm², 300° C.[3] | Conventional |
| | 15 | " | " | " | Cu Electroplating (10 μm) | " | Occurred after 11 repetitions | Body of pipe burst at 1261 kgf/cm², 300° C.[3] | |
| | 16 | " | " | " | Zn Blowing[1] (10 μm) | " | No occurrence after 20 repetitions | Body of pipe burst at 1270 kgf/cm², 300° C.[4] | Invention |
| | 17 | " | " | " | Al Blowing[2] (10 μm) | " | " | Body of pipe burst at 1263 kgf/cm², 300° C.[4] | |
| B | 18 | " | " | " | Al Blowing[2] (10 μm) | " | " | Body of pipe burst at 1260 kgf/cm², 400° C.[4] | |
| | 19 | 219.1 | 8.94 | 63 | Zn Electroplating (10 μm) | 1100 | Occurred after 7 repetitions | Body of pipe burst at 622 kgf/cm², 300° C.[3] | Conventional |
| | 20 | " | " | " | Cu Electroplating (10 μm) | " | Occurred after 11 repetitions | Body of burst at 619 kgf/cm², 300° C.[3] | |
| | 21 | " | " | " | Zn Blowing[1] (10 μm) | " | No occurrence after 20 repetitions | Body of pipe burst at 623 kgf/cm², 300° C.[4] | Invention |
| | 22 | " | " | " | Al Blowing[2] (10 μm) | " | " | Body of pipe burst at 625 kgf/cm², 300° C.[4] | |
| | 23 | " | " | " | Al Blowing[3] (10 μm) | " | " | Body of pipe burst at 618 kgf/cm², 400° C.[4] | |

Note:
[1] Particle Diameter 0.5 mm, Propellant Force 4 kgf/cm²;
[2] Particle Diameter 0.1 mm, Propellant Force 6 kgf/cm²;
[3] Heated after the first connection and then applied hydraulic pressure. (Samples used in the galling test could not be used.)
[4] Heated after the 21st connection and then applied hydraulic pressure.

TABLE 3

| | | | | Results of Delay Fracture Test | | | | |
|---|---|---|---|---|---|---|---|---|
| Alloy | No. | Outer Diameter (mm) | Thickness (mm) | Tensile Stress (kgf/mm²) | Temperature (°C.) | Baking | Delay Fracture | Remarks |
| | 1 | 219.1 | 8.94 | 105 | 20 | — | Broken after 50 hr | Conventional |
| | 2 | " | " | " | " | 250° C. × 12 hr | Not Broken after 100 hr | |
| A | 3 | " | " | " | " | 250° C. × 24 hr | Not Broken after 100 hr | |
| | 4 | " | " | " | 200 | 250° C. × 12 hr | Broken after 10 hr | |
| | 5 | " | " | " | " | 250° C. × 24 hr | Not Broken after 100 hr | Invention |
| | 6 | " | " | " | 20 | — | Not Broken after 100 hr | |
| | 7 | " | " | " | 200 | — | Not Broken after 100 hr | |
| B | 8 | " | " | " | 20 | — | Not Broken after 100 hr | Invention |
| | 9 | " | " | " | 200 | — | Not Broken after 100 hr | |

EXAMPLE 2

A lot of pipes each having predetermined dimensions were manufactured from a high-alloy material having a strength of as high as 70 kgf/mm² or more. Pin-box type joints having a threaded portion and a metal sealing portion were shaped by machining.

In this example, a blasting material comprising particles each having the structure shown in FIG. 2 (zinc content =35% by weight) was blasted at the pin and box type joints by means of a conventional air blasting device (see FIG. 3) and a mechanical blasting device (using the before-mentioned impeller-type blaster) to form a blast plating on the pin and the metal sealing portion. The blasting was applied to each of the machined surfaces.

The blasting conditions in this example are summarized in Table 4.

The thus-obtained joints were evaluated in respect to the resistance to galling and sealing properties.

The results are summarized in Table 5.

As is apparent from the results shown in Table 5, when a blast plating is provided in accordance with the present invention, the resistance to galling is 2~3 times higher that than of a joint with conventional electroplating, and the sealing properties are satisfactory even after 20 repetitions of connecting and disconnecting. In addition, according to the present invention, the process is a dry process, and there is no problem of delayed fracture caused by the absorption of hydrogen.

TABLE 4

| Type | Air Blasting Compressed Air | Mechanical Blasting Rotation of Impeller |
|---|---|---|
| Blasting Speed | 50~100 m/sec | 30~80 m/sec |
| Blasting Rate | 0.5~20 kg/min | 20~100 kg/min |
| Surface Roughness | 3~30 μm (Rmax) | 5~30 μm (Rmax) |
| Movement of Work Piece | Rotating (6~20 RPM) | Rotating (4~10 RPM) |

TABLE 5

| | Outer Diameter (mm) | Thickness (mm) | Material | Yield Stress (kgf/mm²) | Treatment[1] Pin | Treatment[1] Box | Clamp Torque (kgf·m) | Galling[2] | Pressure[3] Applied (kgf/cm²) |
|---|---|---|---|---|---|---|---|---|---|
| Invention | 139.7 | 7.72 | 25 Cr—50 Ni | 77 | Mechanical Blasting 10 μm thick, porosity 60% | Mechanical Blasting 10 μm thick, porosity 60% | 840 | No Galling after 20 repetitions | 950 |
| | " | " | " | " | Air Blasting 10 μm, porosity 50% | Air Blasting 10 μm porosity 50% | " | " | 956 |
| | " | " | 1 Cr—0.5 Mo | 105 | Mechanical Blasting 10 μm thick, porosity 60% | Mechanical Blasting 10 μm thick, porosity 60% | 950 | " | 1260 |
| | " | " | " | " | Air Blasting 10 μm, porosity 50% | Air Blasting 10 μm, porosity 50% | " | " | 1250 |
| | 244.5 | 11.99 | 25 Cr—50 Ni | 77 | Mechanical Blasting 10 μm thick, porosity 60% | Mechanical Blasting 10 μm thick, porosity 60% | 2200 | " | 850 |
| | " | " | " | " | Air Blasting 10 μm, porosity 50% | Air Blasting 10 μm, porosity 50% | " | " | 845 |
| | " | " | 1 Cr—0.5 Mo | 105 | Mechanical Blasting 10 μm thick, porosity 60% | Mechanical Blasting 10 μm thick, porosity 60% | 2200 | " | 1103 |
| | " | " | " | " | Air Blasting 10 μm, porosity 50% | Air Blasting 10 μm, porosity 50% | " | " | 1110 |
| Conventional | 139.7 | 7.72 | 25 Cr—50 Ni | 77 | Machined, Roughness 3 μm max. | Cu Electroplating 10 μm thick | 840 | Galling after 12 repetitions | |
| | " | " | " | " | " | Zn Electroplating 10 μm thick | " | Galling after 7 repetitions | |
| | " | " | 1 Cr—0.5 Mo | 105 | " | Zn Electroplating 10 μm thick | 950 | Galling after 6 repetitions | |
| | " | " | " | " | Zn Phosphate, 7 μm thick | Mn Phosphate 7 μm thick | " | Galling after 8 repetitions | |
| | 244.5 | 11.99 | 25 Cr—50 Ni | 77 | Machined, Roughness 3 μm max. | Cu Electroplating 10 μm thick | 2200 | Galling after 11 repetitions | |
| | " | " | " | " | " | Zn Electroplating 10 μm thick | " | Galling after 7 repetitions | |
| | " | " | 1 Cr—0.5 Mo | 105 | " | Zn Electroplating 10 μm thick | 2200 | Galling after 7 repetitions | |
| | " | " | " | " | Zn Phosphate, 7 μm thick | Mn Phosphate, 7 μm thick | " | Galling after 8 repetitions | |

Note:
[1]Porosity (%) = {1-weight/(Volume × Specific Gravity)} × 100
[2]Evaluated in terms of number of repetitions of connecting and disconnecting before galling occurs. In the present invention, the samples were subjected to 20 repetitions of connecting and disconnecting. In the conventional samples, galling occurred before testing.
[3]Evaluated in terms of bursting pressure of the body of pipe when hydraulic pressure applied.

INDUSTRIAL APPLICABILITY

As explained in detail hereinbefore, the present invention does not required a complicated electroplating apparatus and is free from delay fracture which is caused by hydrogen ions entrapped during electroplating in an aqueous solution. In addition, according the the present invention, oil-well pipe joints exhibiting improved sealing properties and galling resistance can be obtained. In light of the recent tendency for oil well pipe joints to be manufactured from high-strength, high-alloy materials, the above advantages of the present invention are particularly significant.

Furthermore, in practicing the present invention to form an MP film, irrespective of whether air blasting or mechanical blasting is employed, an article to be treated, i.e., a pin-type joint member and box-type joint member may be held in a place and the blasting apparatus can be moved. Alternatively, the article may be rotated and the blasting apparatus can be adjusted to follow it. In either case, according to the present invention, plating can be applied to an area where it is difficult to apply plating by conventional methods.

Since the blowing rate of mechanical blowing process is 4~5 times higher than that of an air blowing process, a mechanical blowing process is suitable for mass production of large-diameter pipe joints. On the other hand, an air blasting process is freely applicable to a variety of pipe joints ranging from small-diameter pipe joints to large-diameter pipe joints. Thus, it is possible to markedly reduce the manufacturing costs by suitably selecting the type of blasting depending on the purpose thereof.

Thus, according to the present invention, it is possible to produce oil well pipe joints which are superior to conventional pipe joints regarding the sealing properties and the resistance to galling at remarkably reduced manufacturing costs in comparison to the prior art. The effectiveness of the present invention is remarkable from a monetary viewpoint.

While the present invention has been described with reference to the foregoing embodiments, many changes and modifications may be made thereto which fall within the scope of the appended claims.

We claim:

1. An oil well pipe joint which comprises a threaded portion and a metal sealing portion and which has a plating layer at least on the metal sealing portion, characterized in that the plating layer is a blast-plated layer of particles of a soft metal or an alloy thereof having a melting point higher than the service temperature of the oil well pipe joint.

2. An oil well pipe joint as defined in claim 1, in which the thickness of the blast-plated layer is 1~30 μm.

3. An oil well pipe joint as defined in claim 1, wherein the blast-plated layer comprises particles of aluminum.

4. An oil well pipe joint as defined in claim 1, wherein the blast-plated layer comprises particles of zinc.

5. An oil well pipe joint as defined in claim 1, wherein the blast-plated layer comprises an iron or iron alloy core covered by a zinc or zinc alloy coating.

6. An oil well pipe joint as defined in claim 1, wherein the blast-plated layer comprises a porous blast-plated layer.

7. An oil well pipe joint as defined in claim 6, wherein the porous blast-plated layer includes an lubricant impregnated therein.

8. An oil well pipe joint as defined in claim 7, wherein the porous blast-plated layer has a porosity of 20–80%.

9. An oil well pipe joint as defined in claim 1, wherein the blast-plated layer of particles comprises a plurality of layers of particles, each of the layers being slidable and individual particles being removable from the blast-plated layer due to a shearing force caused by rotation of the threaded portion and the metal sealing portion without peeling off the blast-plated layer.

10. An oil well pipe joint having improved resistance to galling, which comprises a threaded portion and a metal sealing portion, and which has a plating layer at least on the metal sealing portion, characterized in that the plating layer is a porous blast-plated layer obtained by blasting discrete particles each comprising an iron or iron alloy core covered by a zinc or a zinc alloy coating with an iron-zinc alloy layer intervening therebetween.

11. An oil well pipe joint as defined in claim 10, in which the oil well pipe joint is made of a high-alloy steel containing 5~45% by weight of Cr and 0~60% by weight of Ni.

12. An oil well pipe joint as defined in claim 10, wherein the porous blast-plated layer includes a lubricant impregnated therein.

13. An oil well pipe joint as defined in claim 10, wherein the porous blast-plated layer has a porosity of 20–80%.

14. An oil well pipe joint as defined in claim 10, wherein the blast-plated layer of particles comprises a plurality of layers of particles, each of the layers being slidable and individual particles being removable from the blast-plated layer due to a shearing force caused by rotation of the threaded portion and the metal sealing portion without peeling off the blast-plated layer.

15. An oil well pipe joint as defined in claim 10, wherein the zinc or zinc alloy comprises 20–60 weight % of each of the particles and the iron or iron alloy comprises 40–80 weight % of each of the particles.

16. A process for manufacturing an oil well pipe joint which comprises a threaded portion and a metal sealing portion and which has a plating layer at least on the metal sealing portion, characterized in that after finish machining, a blast-plated layer is provided by blasting onto the machined surface of at least the metal sealing portion a blasting material of particles of a soft metal or an alloy thereof having a melting point higher than the service temperature of the oil well pipe joint.

17. A process as defined in claim 16, in which the average diameter of said particles is 0.05~1.5 mm and the particles are blasted at a blasting pressure of 2~6 kgf/cm$^2$ to form the blast-plated layer of fine particles.

18. A process as defined in claim 16, wherein the particles are blasted mechanically at a rate of 20–100 kg/min.

19. A process for manufacturing an oil well pipe joint having improved resistance to galling which comprises a threaded portion and a metal sealing portion, and which has a plating layer at least on the metal sealing portion, characterized in that after finish machining, a porous blast-plated layer is provided by blasting onto the machined surface of at least the metal sealing portion discrete particles each comprising an iron or iron alloy core covered by a zinc or a zinc alloy coating with an iron-zinc alloy layer intervening therebetween.

20. A process as defined in claim 19, wherein the particles are blasted mechanically at a rate of 20–100 kg/min.

* * * * *